Figure 1:
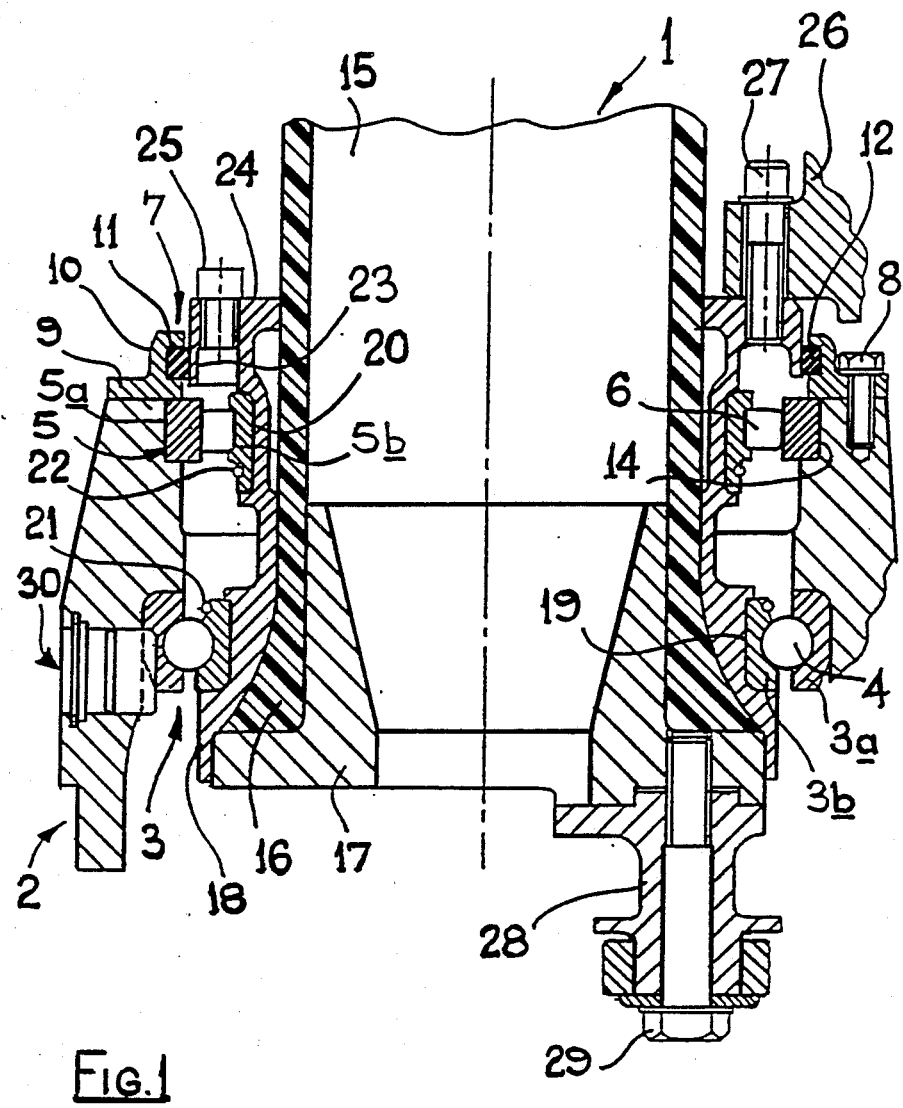

United States Patent [19]

Poucher et al.

[11] Patent Number: 4,921,403
[45] Date of Patent: May 1, 1990

[54] PROPELLER BLADE ASSEMBLY

[75] Inventors: Michael Poucher; Roger W. Seeley, both of Cheltenham, United Kingdom

[73] Assignee: Dowty Rotol Limited, Gloucester, England

[21] Appl. No.: 296,123

[22] Filed: Jan. 12, 1989

[30] Foreign Application Priority Data

Jan. 15, 1988 [GB] United Kingdom ............... 8800932

[51] Int. Cl.⁵ ............................................. B64C 11/32
[52] U.S. Cl. ..................................... 416/147; 416/205
[58] Field of Search ............... 416/147, 204, 205, 209, 416/239, 248, 208

[56] References Cited

U.S. PATENT DOCUMENTS

| | | | |
|---|---|---|---|
| 1,951,321 | 3/1934 | Blanchard | 416/205 |
| 2,297,142 | 9/1942 | German | 416/239 X |
| 2,438,542 | 3/1948 | Cushman | 416/147 |
| 2,628,687 | 2/1953 | Allen | 416/205 |
| 2,628,688 | 2/1953 | Diefenderfer | 416/205 X |
| 2,939,536 | 6/1960 | Kearns | 416/208 X |
| 3,029,876 | 4/1962 | Scott | 416/205 |
| 3,231,313 | 1/1966 | Fermer | 416/147 X |
| 3,459,267 | 8/1969 | Chilman | 416/147 X |
| 3,490,537 | 1/1970 | Quenneville | 416/205 X |
| 4,591,313 | 5/1986 | Miyatake et al. | 416/129 R X |
| 4,717,312 | 1/1988 | Seeley | 416/147 X |

FOREIGN PATENT DOCUMENTS

| | | | |
|---|---|---|---|
| 443750 | 3/1936 | United Kingdom | 416/209 |
| 485978 | 5/1938 | United Kingdom | 416/209 |

Primary Examiner—Everette A. Powell, Jr.
Attorney, Agent, or Firm—Young & Thompson

[57] ABSTRACT

A propeller blade assembly which enables the mounting of a propeller blade in a hub assembly includes a bearing arrangement that circumferentially surrounds and engages with a section of the propeller blade. The bearing arrangement comprises an inner race assembly of angular contact bearings, and an outer race assembly of roller bearings. The roller bearings being arranged so that the axis of rotation thereof is substantially parallel to the longitudinal axis of the propeller blade.

3 Claims, 2 Drawing Sheets

PROPELLER BLADE ASSEMBLY

This invention relates to a propeller blade root assembly for mounting of a propeller blade, and in particular, for the mounting of a propeller blade which in use will exert a high thrust loading on the bearing assembly.

Over recent years propeller blade technology has advanced rapidly with the introduction of composite propeller blade structures. This has enabled propeller blades to be increased in dimension without a significant increase in weight, and in a number of cases a reduction in weight. Consequently there has been an increase in the net load applied to the bearings of the root assembly.

The net load applied to the bearing has two major components, a centrifugal or radial component acting in a direction parallel to the longitudinal axis of the propeller blade, and a side loading or thrust component acting in a direction transverse to the centrifugal or radial component and parallel to the rotational axis of the drive shaft.

With the introduction of composite blades, there has been an increase in the thrust produced by the propeller blade and, hence the side loading or thrust component. This side loading or thrust component induces bending moments into the bearing assembly. However, due to the characteristics of the design of composite structured propeller blades there is no increase, or a reduction, in the centrifugal or radial loading.

At present two very basic forms of bearing assembly are employed in conventional blade root assemblies. The first of these bearing assemblies simply comprises a single race of ball-bearings. In some assemblies where high radial loads are induced, the single bearing is replaced with two or more races, closely positioned to one another so as to act as a single bearing assembly. With this form of bearing the following problems have been encountered when the thrust or side loading is high, as with composite blades:

(1) The propeller blades are unstable, leading to major constructional problems.

(2) This side loading or thrust component leads to movement of the propeller blade relative to the bearing assembly. This movement is sufficient to prevent adequate sealing being achieved between propeller blade and the hub into which it is mounted under the high thrust or side loading.

(3) The bearing can become non-uniformally loaded which in some circumstances allowing one edge of the blade to lift off the bearing.

and (4) The high bending moments induced tend to cause a degree of shank deflection, again preventing adequate sealing.

Generally, under high thrust or side loading, this form of conventional bearing assembly is not adequate, and will not provide a sufficiently integral assembly.

The only way of compensating for the increased side loading or thrust component and thereby provide a workable solution to this problem is to make the bearings larger in diameter. When this is coupled to the tendency of today to provide the propeller with six blades, the end result is a hub assembly which is:

(a) very large in diameter with inadequate stiffness,
(b) very heavy,
and (c) costly to construct.

In a second form of known double bearing assembly the bearing is preloaded and comprises:

an inner race of cylindrical roller bearings, each having an axis of rotation transverse the propeller blade, and an outer race of ball bearings.

This form of bearing suffers from the following problems;

1. As the roller bearing is arranged with the rollers transversely set to the propeller blade, the bearing assembly does not have sufficient tolerance movement to compensate for machinery faults in the propeller blade manufacture. This means the propeller blade will have no flexibility in motion from within the root assembly, and as a result the loading in the bearing, particularly the outer race, will not be evenly distributed. In an attempt to reduce the effects of this uneven loading, a degree of preloading is provided to the bearing assembly. In fact it is very doubtful if this form of bearing assembly would work without sufficient preloading.

2. As a result of the preloading, the frictional components in the bearing are extremely high relative to an unpreloaded bearing. The degree of this frictional force prevents two or more of the assemblies from being synchronised or synchrophased.

and 3. Due to the use of a ball-bearing race as the outer race, the bending moments applied to the assembly tend to cause a very high degree of movement about the outer race of the assembly. This could be as much as 20 thousandths of an inch, and with this amount of movement it is impossible to provide the assembly with a sufficiently adequate seal to prevent loss of lubricant.

The present invention is concerned with providing a smaller, lighter bearing assembly which can accommodate the higher bending movements associated with composite propeller blades.

In accordance with the present invention a propeller blade root assembly for mounting of a propeller blade includes a bearing arrangement which circumferentially surrounds and engages a section of the propeller blade and which comprises:

an inner race assembly,
and an outer race assembly longitudinally spaced from the inner race assembly,
wherein when a propeller blade is mounted in the assembly the inner race comprises a multiplicity of angular contact bearings and the outer race comprises a multiplicity of roller bearings, each of which roller bearings has an axis of rotation which is substantially parallel to the longitudinal axis of the propeller blade.

A blade root assembly in accordance with the present invention has the following advantages:

(1) The blade root assembly will be smaller in size than a conventional assembly for the same purpose.

(2) The blade root assembly will be lighter, in weight than a conventional assembly for the same purpose, and therefore cheaper to manufacture.

(3) The bearing assembly provides a line (locus) of points of stability, in comparison to a point of stability with conventional designs. This provides the blade root assembly with a very stable operation zone. Therefore, a stable operation base for the propeller blade is easily attained. However, the length of the line of stability is dependent on the separation between the inner and outer races. Therefore, a balance has to be struck between stability and hub size.

(4) The use of rollers in the outer bearing race restricts sideways movement of the propeller blade. Therefore sealing arrangements used in the present invention, will not be subjected to the excessive movements that are experienced with conventional assemblies and sealing arrangements used with the present invention will work to their design capacity.

and (5) The inner angular contact ball-bearing allows the blade to articulate. This allows the outer bearing to take a proportion of the side loading or thrust component and, hence some of the bending moment.

In the bearing assembly of the present invention the inner race of angular contact bearings absorbs/carries the centrifugal or radial loading component, as well as a degree of the side loading or thrust component, and the roller bearing absorbs only the side loading or thrust component of the loading. In this way the operation of the two races are independent and do not tend to interfere with each other.

Further, in the use of a bearing assembly in accordance with the present invention the use of an inner race of angular contact bearings means that the propeller can be articulated within design tolerances to compensate for machinery inaccuracies. Thereby, the load exerted on the bearings will be evenly distributed or substantially so.

As a result of this even distribution, the assembly can be operated either under a preloading or without a preloading. The assembly is, preferably, not subjected to a preloading force.

In cases where the assembly is not subjected to preloading, it is possible to synchrophase the operation of a number of propellers on a particular craft. Preferably, in which case the propellers are synchrophased.

The blade root assembly of the present invention can be used with any conventional design of hub, for example a single piece or two piece hub.

In order to increase the safety aspects of the invention, in particular to reduce the chance that a propeller blade will be released on cracking or failure of the hub, preferably the angular contact bearing is positioned close to the plane of rotation.

Further, in order to reduce the possibility of the hub failing due to fatigue, preferably the assembly is made without any screw threads being present. This is because the presence of screw threads can lead to fatigue cracks, and subsequent failure of the hub.

With a single piece hub to assist with the loading of the bearings into the races filling holes are provided which, preferably, have a central longitudinal axis transverse, to the circumferential central axis but spaced towards the central axis of the hub of the bearings in the race.

Further, in order to eliminate crowding of the race the bearings are preferably mounted in cages.

The angular contact bearings of the inner race are preferably ball-bearings.

In one form, the roller bearings may be tapered such that the centrifugal forces generated help to reduce clearance in the assembly. This in turn prevents unwanted sideways motion in the propeller blade relative to the assembly.

The races of the bearing assembly may be formed in the respective members, however are preferably separate and replaceable members secured onto, or into, a section of the respective members.

Figure 2:
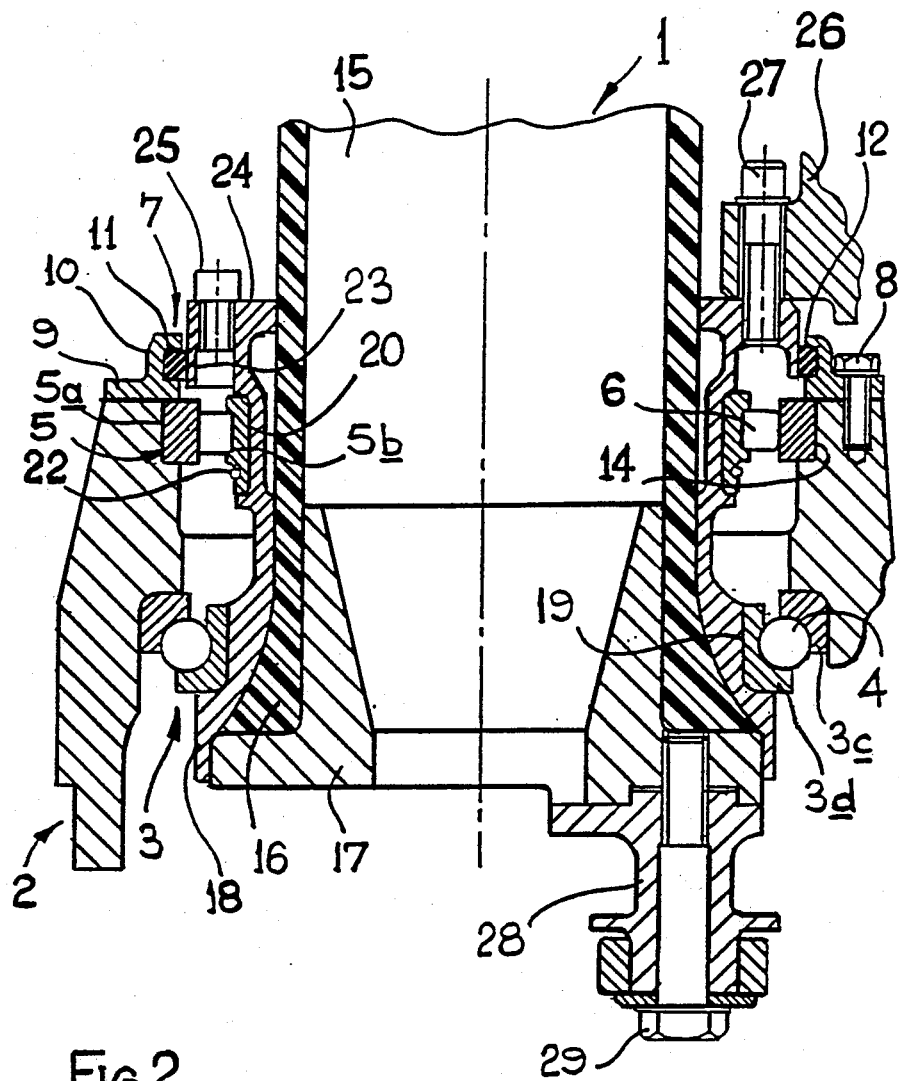

The invention will now be described, by way of example with reference to the accompanying drawing in which:

FIG. 1 shows a schematic view in section of a blade root assembly made in accordance with the invention;

and FIG. 2 shows a schematic view in section, of a second blade root assembly made in accordance with the invention.

Referring to FIG. 1, a blade root assembly for mounting a propeller blade 1 in a hub assembly 2 (partially illustrated) comprises:

an inner ball-bearing race assembly 3 having co-operating race section 3a and 3b which circumferentially extend around the interior of the hub assembly 2 and are manufactured from hardened steel, and steel ball bearing 4 held in a cage (not shown) between the race sections 3a and 3b;

an outer roller race assembly 5 having co-operating race sections 5a and 5b which circumferentially extend around the interior of the hub assembly 2 and are manufactured from hardened steel, and steel rollers 6 held in a cage (not shown) between the race sections 5a and 5b;

and a clamping sealing ring 7 which is bolted by bolts 8 to the hub assembly 2.

The ring 7 comprises a flat section 9 through which bolts 8 extend into the hub assembly 2 and an upright section 10. The upright section 10 defines a channel 11 into which a rubber sealing member 12 can be located.

Further, the ring 7 acts to secure the outer race section 5a in a groove 14 formed in the hub assembly 2 and thereby secure the outer race section 5a in position.

A propeller blade 1 suitable for assembly into the blade root assembly of the present invention comprises:

a composite blade member 15 having a tip section (not shown) and an end section 16 which extends into the hub assembly 2;

an aluminium end piece 17 secured to the interior of the composite blade member 15 at the end section 16 thereof;

and an aluminium bearing sleeve 18 circumferentially extending around and being secured to the end section 16 of the composite blade section 15.

In an alternative arrangement the end piece 17 and/or the bearing sleeve 18 is made from steel.

The bearing sleeve 18 protrudes from the hub assembly 2 when the propeller blade 1 is mounted therein, so that a section/part thereof extends beyond the upright section 10 of the clamping ring 7.

Inner bearing race section 3b and outer bearing race section 5b are secured in grooves 19 and 20 respectively of the bearing sleeve 18 by respective C shaped spring members 21 and 22.

Further all the race sections 3a, 3b, 5a and 5b may be additionally secured into position by additional means, for example, bolted or glued. However, they are secured in such a manner as to enable easy removal, and replacement, in cases of excessive wear or damage thereto by extraneous matter in the bearing etc. In this way the life of the propeller blade may be extended and propeller blades need not be discarded simply because of excessive bearing wear.

The bearing sleeve 18 is also provided with a section 23 at end 24 thereof which engages with the sealing member 12, to maintain the lubricant of the working assembly within the area of the blade root assembly, and prevent entry of dirt, moisture, etc., which may cause damage, for example, corrosion to the bearing sections.

An access hole, having a plug 25 is provided in the end 24 of the bearing sleeve 18 for co-operation with a ball assembly tool (not shown) during assembly.

Counter weights 26, for example horseshoe counterweights, may be bolted by means of bolts 27 to the end 24 of the bearing sleeve 18 so as to balance and stabilise the operation of the propeller blade.

The end piece 17 has a connecting member 28 which is bolted thereto by a bolt 29, for co-operation with a pitch changing mechanism (not shown) of the hub assembly 2.

With a single piece hub in order to enable easier loading of the bearing members 4 and 6, during assembly of the propeller blade in the hub assembly, the race assemblies 3, 5, can be provided with filling holes 30 having a longitudinal axis transverse to but spaced nearer the axis of rotation of the hub assembly 2. Only the filling hole 30 for the inner race of ball-bearings is shown in the drawing.

However, in the preferred two piece hubs, there is no requirement for the filling holes 30 to be present, and they can be simply omitted.

In all aspects, except the filling holes, the basic design of the assembly is very similar, no matter what general type of hub, for example single or two piece, is used.

Now referring to FIG. 2 of the drawings, a second arrangement of propeller blade assembly is shown. This arrangement is essentially the same as that described with reference to FIG. 1 of the drawings and hence like numerals have been used to describe the components.

The propeller blade assembly shown comprises a two piece hub assembly. Therefore, the filing hole 30 included in the arrangement of FIG. 1 can be omitted.

Further, with this arrangement of propeller blade assembly the inner ball bearing race assembly 3 differs in design from that of the assembly shown in FIG. 1. In effect the ball bearing race assembly 3 of this arrangement is designed so that the axis of the force placed on the bearing race assembly 3 passes through the centre of the contacting surfaces of the ball and the ball bearing race assembly race sections 3c and 3d.

In order to facilitate this, the race sections 3c and 3d of the assembly are slightly wrapped around the ball bearings 4 in order to locate the contacting surfaces thereof appropriately.

Further, as with the assembly shown in FIG. 1 of the drawings, the bearing members 4 and 6 are mounted in a cage (not shown). The cage being shaped so that it passes through the gaps between the race sections 5a and 5b and 3c and 3d respectively.

We claim:

1. A propeller blade root assembly for mounting of a propeller blade, said blade root assembly comprising a split hub and an anti-friction bearing arrangement adapted to circumferentially surround and engage a section of a propeller blade received in said assembly, said anti-friction bearing arrangement consisting essentially of an inner race assembly having a single race; and
an outer race assembly having a single race and spaced longitudinally from the inner race assembly; said inner race being filled with a plurality of angular contact bearings and said outer race being filled with a plurality of roller bearings, each of said plurality of roller bearings having an axis of rotation substantially parallel to the axis of rotation of a propeller blade received in said blade route assembly, wherein said angular contact bearings and said roller bearings of said bearing arrangement are free of any preloading forces.

2. The propeller blade root assembly according to claim 1, wherein said inner race assembly will be adjacent a proximate end of a propeller blade received in said blade root assembly.

3. The propeller blade root assembly according to claim 1, wherein said assembly is free of any screw threading.

* * * * *